June 26, 1962  J. L. KENNEMER  3,040,724
AUTOMATIC CAR STARTER

Filed Aug. 14, 1959  4 Sheets-Sheet 1

James L. Kennemer
INVENTOR.

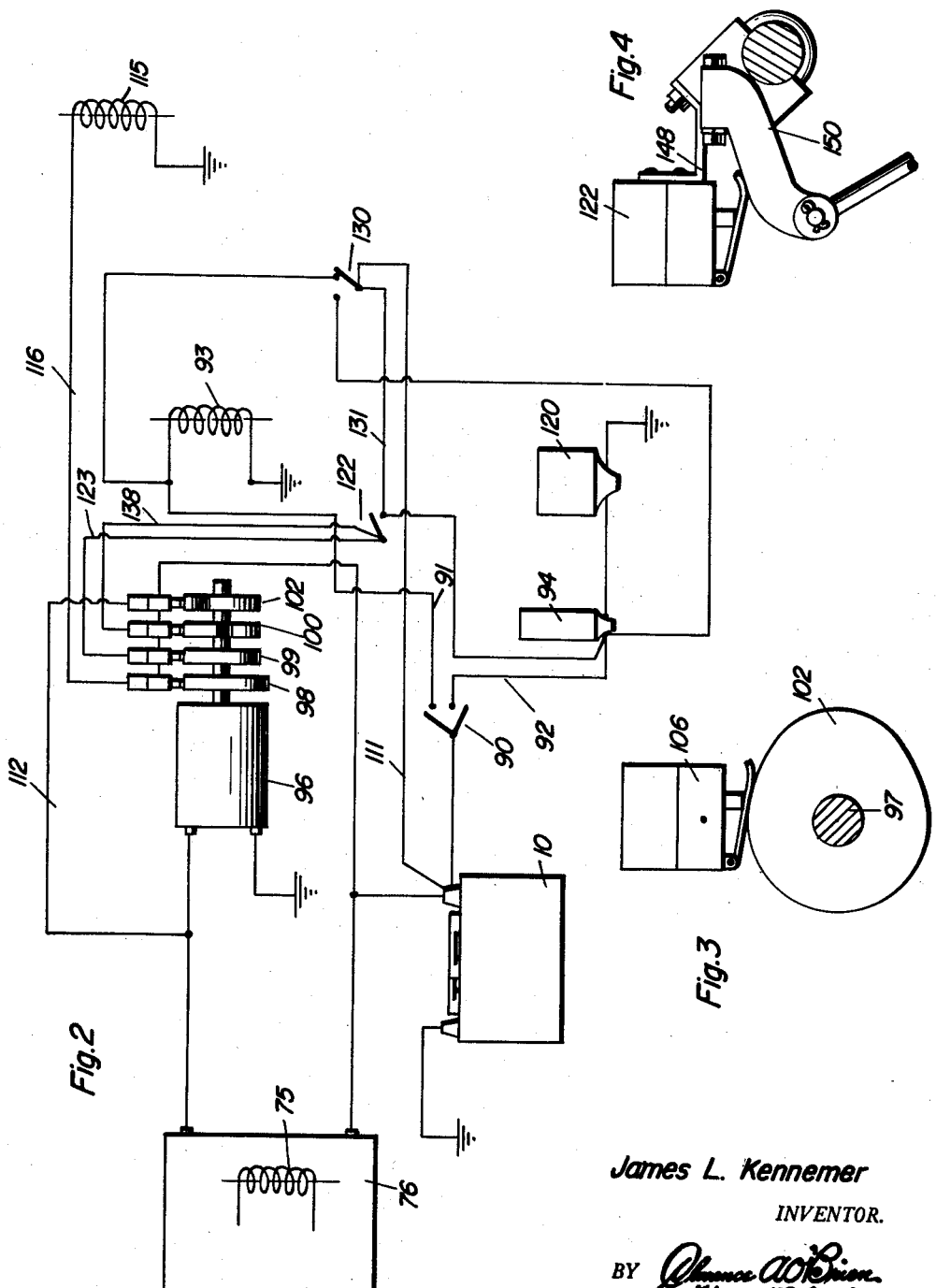

June 26, 1962 J. L. KENNEMER 3,040,724
AUTOMATIC CAR STARTER
Filed Aug. 14, 1959 4 Sheets-Sheet 3

James L. Kennemer
INVENTOR.

BY *Clarence A. O'Brien*
and *Harvey B. Jacobson*
Attorneys

United States Patent Office 3,040,724
Patented June 26, 1962

3,040,724
AUTOMATIC CAR STARTER
James L. Kennemer, Golden, Colo., assignor to J. T. S. Enterprises, Inc., Denver, Colo., a corporation of Colorado
Filed Aug. 14, 1959, Ser. No. 833,733
8 Claims. (Cl. 123—179)

This invention relates to motor vehicle equipment and more particularly to a remote controlled automatic vehicle starting apparatus.

An object of the invention is to provide an apparatus which may be installed in existing motor vehicles or supplied as original equipment, the apparatus adapted to automatically start a motor vehicle without the necessity of the motor vehicle operator entering the vehicle.

Briefly, the apparatus is composed of a tone modulated radio transmitter, a tuned frequency radio receiver and control apparatus operatively connected with various parts of the vehicle power plant. Upon actuation of the radio transmitter, either by the motorist or by a clock, a signal is transmitted from the transmitter located remotely from the motor vehicle, the same signal is received to operate a relay which starts the function of various parts of the apparatus operatively connected with a number of the components of the power plant. These components are the same as those which would be actuated by the operator of the motor vehicle, either directly or indirectly if he were manually starting his motor vehicle.

Although there have been prior automatic motor vehicle starting devices, the apparatus in accordance with the invention is believed to be superior to all others for a number of reasons which will more fully become evident as the description proceeds. One very practical advantage is that the receiver is operatively connected with a relay so that the receiver may be maintained energized using only a very low power consumption.

Another advantage and feature of the invention is that the apparatus undergoes a full cycle of operation each time that the relay is pulsed, but if the motorist fails to leave his motor vehicle in a neutral or "park" position insofar as the transmission is concerned, the motor vehicle will fail to start.

Another important feature of the invention is that the apparatus may be packaged as a unit with a number of lead wires extending therefrom with specific instructions as to how to connect the lead wires to automatically and properly install the apparatus in a motor vehicle. The conventional wiring within the motor vehicle is not altered; instead, additional wiring and units are properly located and operatively connected with the existing parts and components operatively associated with the power plant of the motor vehicle.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 2 is a completely diagrammatic view showing principally the functions of the various parts of the apparatus.

FIGURE 3 is an enlarged sectional view taken on the line 3—3 of FIGURE 1.

FIGURE 4 is an enlarged sectional view taken on the line 4—4 of FIGURE 1.

Figure 5:
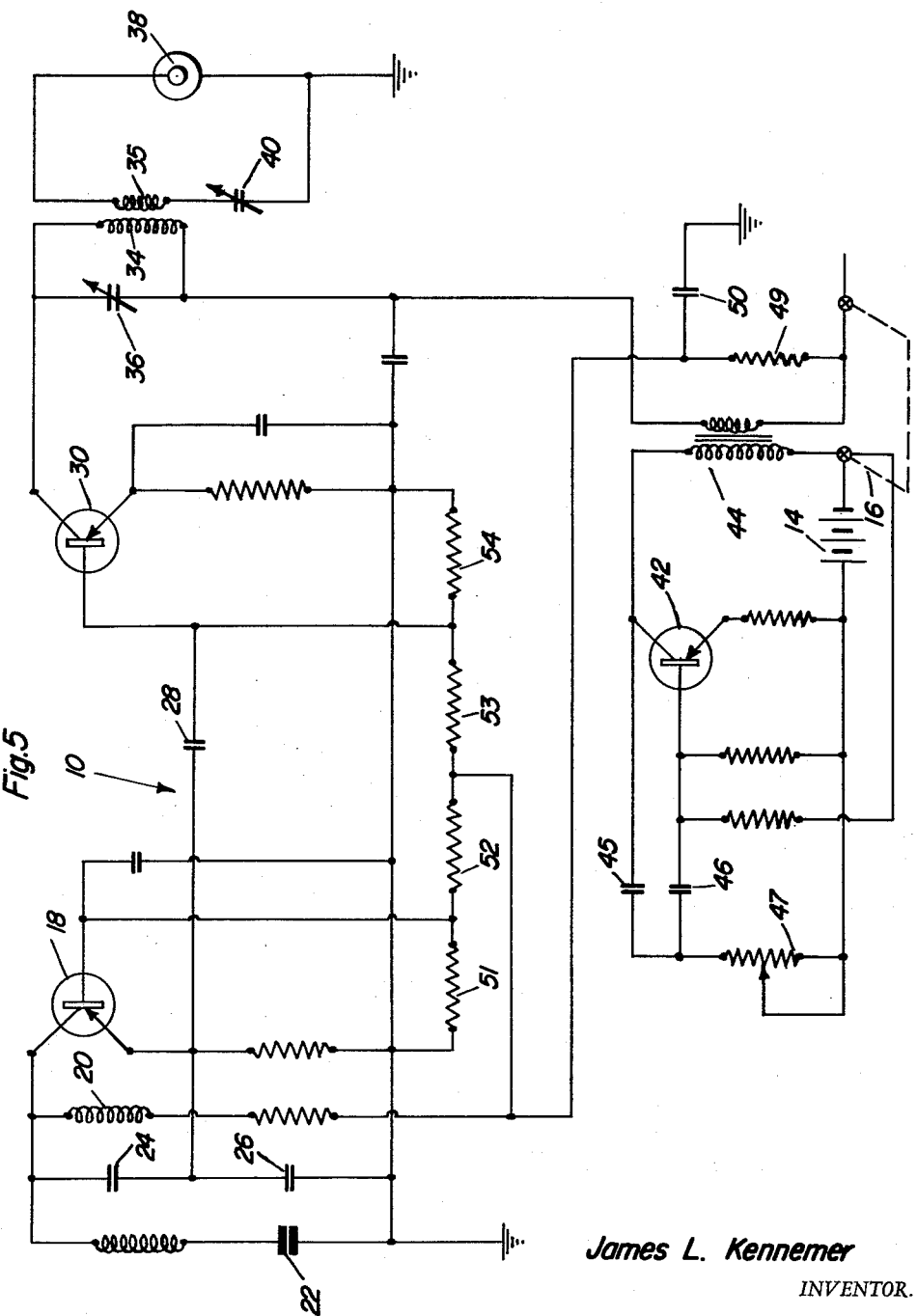
FIGURE 5 is a schematic showing a transistor transmitter suggested for use with the apparatus and as a part thereof.
Figure 6:
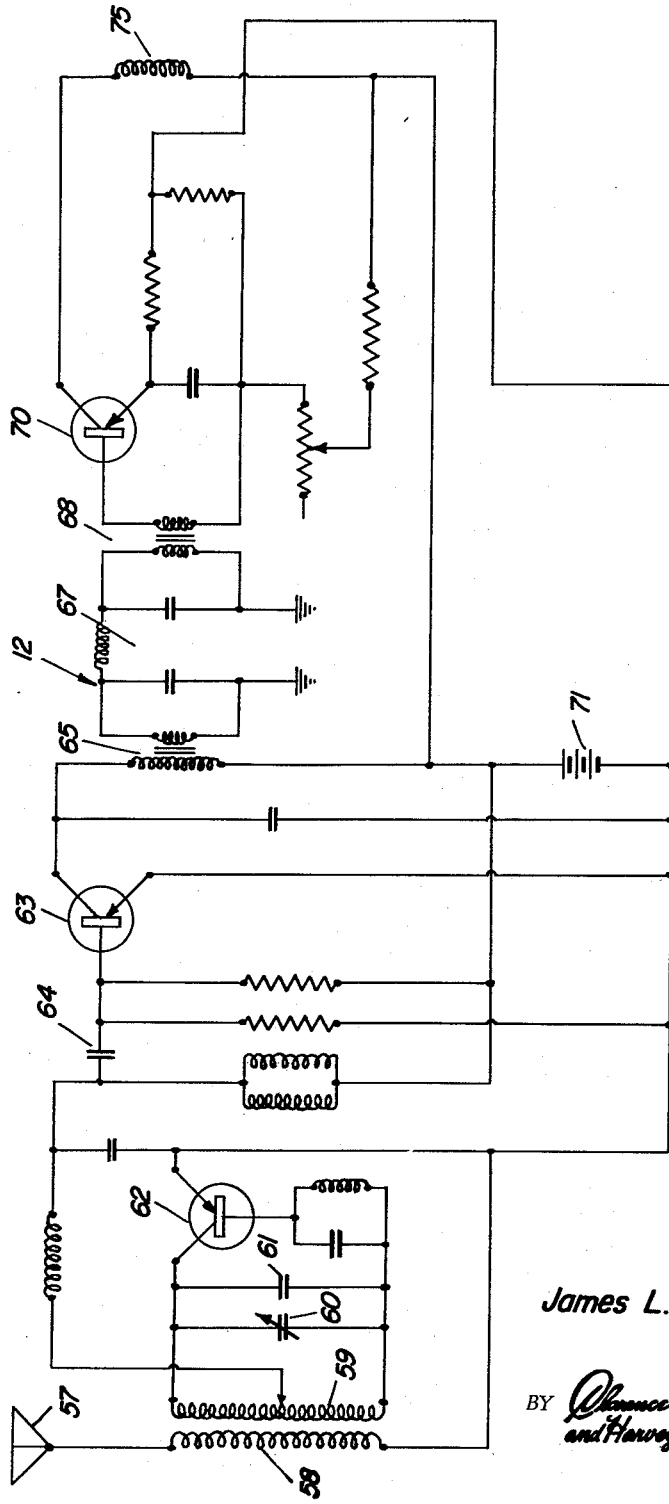
FIGURE 6 is a diagrammatic view of the receiver.

In the accompanying drawings reference is made first to FIGURES 5 and 6 showing a tone modulated RF transmitter 10 and a tuned frequency receiver 12 respectively. The transmitter 10 is a crystal controlled radio transmitter modulated by an audio frequency of 400–1500 cycles per second with a carrier output of one watt. The transmitter is preferably operated on a frequency of 27.750 megacycles on the citizens' band. Numerous configurations of transmitters may be adapted, one of which includes a battery 14 controlled by double-pole single-throw switch 16, which may be a push button switch, which places oscillator transistor 18 into operation. Oscillator 18 is tuned by coil 20 and crystal 22 which forms a tuned circuit operating on the citizens' band frequency. This frequency is coupled by capacitors 24 and 26 through capacitor 28 to RF amplifier transistor 30. Transistor 30 is an ordinary RF amplifier which is tuned to the operating frequency by coil 34 and capacitor 36. Coil 35 couples the tank circuit of the radio frequency amplifier to the antenna 38 and is tuned by the secondary winding 35 of coil 34 and capacitor 40.

The radio frequency is modulated by transistor 42, which is an audio tone generator. Voltage is fed from transistor 42 through transformer 44, with a feed back loop composed of capacitor 45, capacitor 46 and resistor 47, which control the frequency of the audio signal. The frequency is varied by changing the resistance of resistor 47, and the audio output of transistor 42 is coupled through the modulation transformer 44. The secondary of transformer 44 is in series with the voltage supply battery to the radio frequency amplifier causing the radio frequency to be modulated by the audio frequency, resulting in a modulator carrier being radiated from the antenna. As is evident from the drawing, transistors 18 and 30 are fed from a common power supply and voltage divider formed by resistor 49, capacitor 50, and resistors 51, 52, 53 and 54.

The receiver is a tuned frequency receiver. The radio signal from transmitter 10 is received by antenna 57 and fed to coil 58. Coil 59 and capacitors 60 and 61 form a tuned circuit which is tuned to the citizens' band. The signal is fed to transistor 62 where it is amplified and fed to transistor 63 by capacitor 64. Transistor 63 detects and removes the radio frequency and leaves only the audio frequency, which is amplified and passed to transformer 65.

Transformer 65 and filter 67 form a selective filter unit which will pass only the audio frequency that is generated by the transmitter, so that only the proper transmitter will key the unit when the proper audio frequency is passed through the filter unit. Transformer 68 couples the frequency to transistor 70 which amplifies the tone, causing the transistor to draw current from the power supply 71, the current flowing through coil 75 (please see FIGURE 2) causing this relay coil to be energized and to operate the relay. Since the coil 75 and the entire relay is conventional, the coil will be caused to function, for example, to close the contacts thereof, and this closing of the contacts is used to initiate the starting cycle of operation of the motor vehicle power plant.

Power is supplied for the operation of receiver 12 from the 12 volt automobile storage battery 71, although it is quite evident that 6 volt systems may be used. The drain on the battery at stand-by duty is very low and will not run the battery down if left on continuously so long as there is normal automobile usage. The remaining illustrated components of the receiver are conventional and well known to radio technicians or engineers and are not further described in detail. Obviously, there are filters, a choke and a number of resistors and capacitors necessary for a complete radio receiver, and each is illustrated in FIGURE 6.

Figure 1:
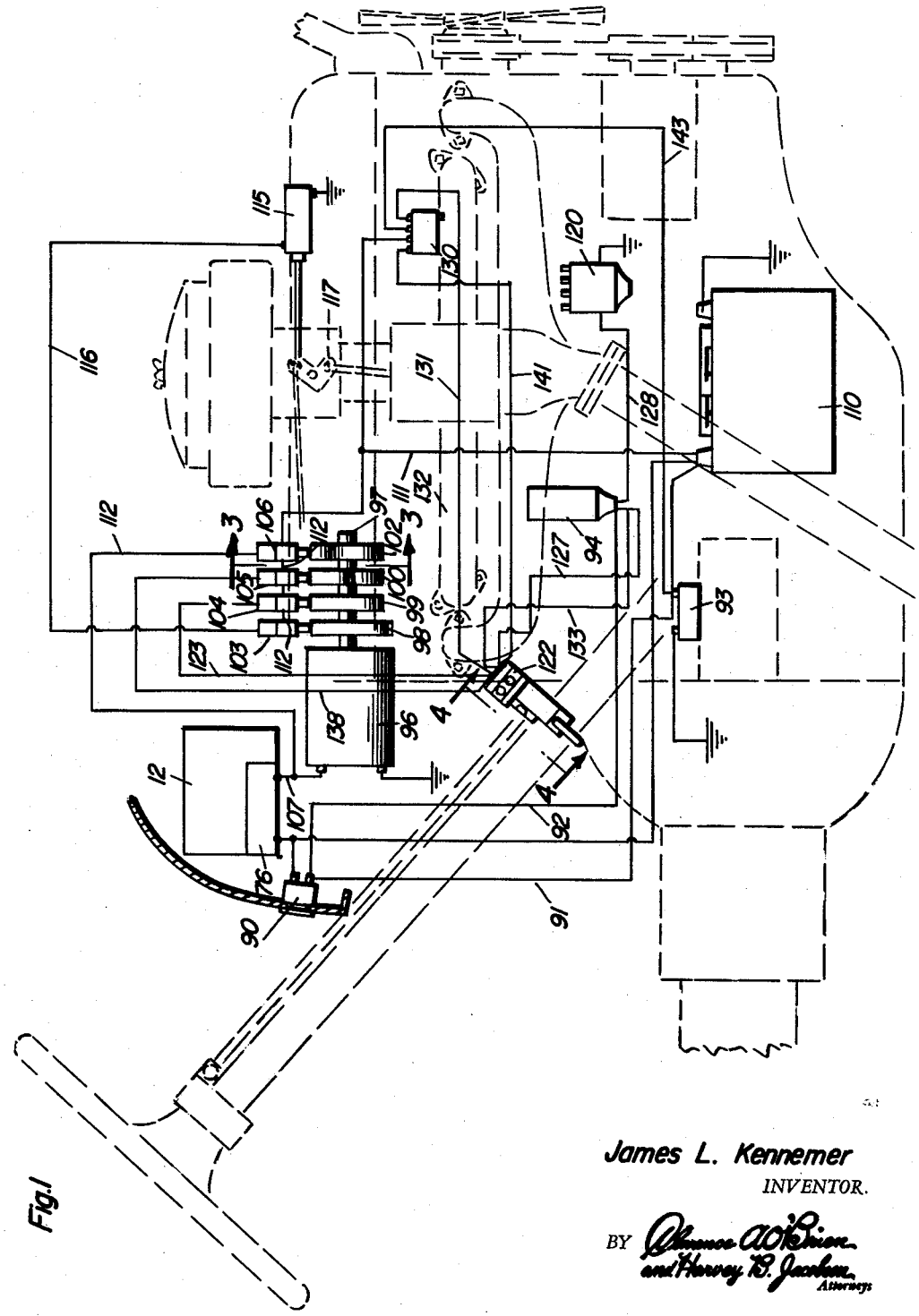
FIGURE 1 is a largely diagrammatic view showing the placement of an apparatus in accordance with the invention within the engine compartment of a conventional motor vehicle; although some of the wiring of the motor vehicle is retained, most of it is omitted in this view in order to show the placement of additional wiring operatively with the various parts of the vehicle power plant.

Attention is now invited to FIGURE 1 showing relay 76 of which coil 75 is a part, together with the radio receiver 12. It is preferred that these be mounted in the engine compartment, although other locations will be satisfactory. The engine and a number of the conventional parts and accessories thereof are shown in both dotted and full lines. There is an ignition switch 90 having conductors 91 and 92 extending therefrom and connecting with starter solenoid 93 and the ignition coil 94 respectively. Conductors 91 and 92 are conventional, i.e. these conductors are already in the motor vehicle and connect with the starter solenoid and coil which are also already installed in the motor vehicle. Essentially all of the other conductors shown in FIGURE 1 are parts of the apparatus for automatically starting the engine. It is felt that a clearer understanding of the apparatus shown in FIGURES 1 and 2 will be obtained if a description of the operation accompanies a description of the wiring and its integration with the engine accessories and parts. There is a motor 96 having a shaft 97 on which there are four cams 98, 99, 100 and 102 respectively. These cams operate four micro-switches 103, 104, 105 and 106. As the main control relay 76 is pulsed by receiver 12, motor 96 is caused to operate by current flowing through conductor 107 from relay 76 and through motor 96 and ultimately to ground. The relay promptly opens, but in the meantime motor shaft 97 has turned far enough to cause cam 102 to close switch 106, and current continues to flow from the motor vehicle battery 110 to motor 96 by way of conductors 111, closed switch 106 and conductor 112 shown joined to conductor 107. All of the cam control switches are fed from conductor 111 which has a number of jumpers 112 coupling the switches together so that current is available in each of the switches 103, 104, 105 and 106 at this condition in the operation.

As motor 96 starts to operate, it actuates switch 103 by means of cam 98, and this supplies current to the carburetor solenoid 115 by way of conductor 116 which is connected to solenoid 115 and also to switch 103. When the solenoid 115 is actuated, it, in turn, causes the carburetor to be primed and the automatic choke to be set since the armature of the solenoid is operatively connected to throttle linkage 117 which, due to the nature of carburetor throttle linkages on modern motor vehicles, causes the accelerator pump of the carburetor and the automatic choke to be actuated.

Micro-switch 104 supplies current to the engine ignition distributor 120 through safety switch 122 which is operatively connected with the shift mechanism of the transmission of the motor vehicle and ignition coil 94. Current is supplied to the distributor through this route for the duration of the cycle of motor 96. The wiring from switch 104 includes conductor 123 to safety switch 122, conductor 127 from switch 122 to coil 94, and conductor 128 from coil 94 to distributor 120.

As the engine starts, a multiple switch 130 which is vacuum operated and connected to the intake manifold 132 of the engine, is operated thereby supplying current to the distributor 120 through switch 122 and the ignition coil 94, so that the engine continues to run after the cycle is completed by motor 96. Electrical conductors 131 from multiple switch 130 to switch 122 and conductor 133 from switch 122 to coil 94 are used for this purpose.

Micro-switch 105 supplies current to starter solenoid 93 through safety switch 122 by way of conductor 138, and from safety switch 122 to the second switch section of multiple vacuum operated switch 130 by way of conductor 141, and finally, from the second switch section of switch 130 to solenoid 93 by means of conductor 143.

Safety switch 122 (FIGURE 4) is mounted by a bracket 148 on a convenient part of the motor vehicle adjacent to the shift lever mechanism 150, and becomes closed when the shift lever of the motor vehicle is in neutral position (standard shift automobiles) or in the neutral-park position for automatic transmission motor vehicles. Safety switch 122 serves a triple purpose. As current is not supplied to the ignition distributor, unless the shift lever is a neutral position, or neutral or park position, for automatic transmission motor vehicles, this prevents starting of the motor vehicle while it is in gear or drive position. It also prevents theft. The current to the starter solenoid 93 is cut-off unless the shift lever is in the neutral or park position in order to prevent the starter from operating and also as a safety feature.

Switch 130, as shown in FIGURE 2, is a multiple switch with one section closed while the other section is open. When the engine of the motor vehicle is not running, as the engine starts, the switch sections reverse their positions thereby opening the switch section that was closed and closing the switch section that was formally open.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A remote controlled automatic starting apparatus for a motor vehicle which has conventional engine equipment including a throttle, an ignition circuit provided with an ignition switch, and a starting motor circuit, said apparatus including a tuned radio receiver, a relay operated by said receiver, a motor controlled by said relay, a group of switches, means connecting said switches for actuation by said motor, one switch of said group of switches connected in parallel with said relay to control the time cycle of said motor whereby the motor may cut itself off after a predetermined time, and electrically operative means connected with the engine accessories and the remaining switches of said group to actuate the accessories.

2. A remote controlled automatic starting apparatus for a motor vehicle which has conventional engine equipment including a throttle, an ignition circuit provided with an ignition switch, and a starting motor circuit, said apparatus including a tuned radio receiver, a relay operated by said receiver, a motor controlled by said relay, a group of switches, means connecting said switches for actuation by said motor, one switch of said group of switches connected in parallel with said relay to control the time cycle of said motor whereby the motor may cut itself off after a predetermined time, means connected with a second switch of said group of switches to actuate said throttle.

3. A remote controlled automatic starting apparatus for a motor vehicle which has conventional engine equipment including a throttle, an ignition circuit provided with an ignition switch, and a starting motor circuit, said apparatus including a tuned radio receiver, a relay operated by said receiver, a motor controlled by said relay, a group of switches, means connecting said switches for actuation by said motor, one switch of said group of switches connected in parallel with said relay to control the time cycle of said motor whereby the motor may cut itself off after a predetermined time, means connected with a second switch of said group of switches to actuate said throttle, means connected with said ignition circuit for by-passing the conventional ignition switch and closing the ignition circuit.

4. A remote controlled automatic starting apparatus for a motor vehicle which has conventional engine equipment including a throttle, an ignition circuit provided with an ignition switch, and a starting motor circuit, said apparatus including a tuned radio receiver, a relay operated by said receiver, a motor controlled by said relay, a group of switches, means connecting said switches for actuation by said motor, one switch of said group of switches connected in parallel with said relay to control the time cycle of said motor whereby the motor may cut itself off after a predetermined time, means connected with a second switch of said group of switches to actuate said throttle, means connected with said ignition circuit for by-passing the conventional ignition switch and closing the ignition circuit, means connected with another switch of said group of switches and said starting motor circuit to close the starting motor circuit.

5. A remote controlled automatic starting apparatus for a motor vehicle which has conventional engine equipment including a throttle, an ignition circuit provided with an ignition switch, and a starting motor circuit, said apparatus including a tuned radio receiver, a relay operated by said receiver, a motor controlled by said relay, a group of switches, means connecting said switches for actuation by said motor, one switch of said group of switches connected in parallel with said relay to control the time cycle of said motor where the motor may cut itself off after a predetermined time, means connected with a second switch of said group of switches to actuate said throttle, means including a third switch of said group connected with said ignition circuit for closing the ignition circuit, vacuum responsive switch means by-passing said third switch to enable the engine to operate after it is started.

6. A remote controlled automatic starting apparatus for a motor vehicle which has conventional engine equipment including a throttle, an ignition circuit provided with an ignition switch, and a starting motor circuit, said apparatus including a tuned radio receiver, a relay operated by said receiver, a motor controlled by said relay, a group of switches, means connecting said switches for actuation by said motor, one switch of said group of switches connected in parallel with said relay to control the time cycle of said motor whereby the motor may cut itself off after a predetermined time, means connected with a second switch of said group of switches to actuate said throttle, means connected with another switch of said group of switches for closing the ignition circuit, self-locking means connected with another switch of said group of switches for closing the starter motor circuit, and vacuum responsive means to open the starter motor circuit and by-pass said self-locking means to establish a closed ignition circuit for the vehicle engine.

7. In a remote control for starting a motor vehicle engine wherein there is a radio transmitter and a radio receiver, a relay activated by a pulse of the receiver, electrical means connected with the relay and the motor vehicle battery current supply for operating the motor vehicle starter solenoid and including an electric motor initially pulsed upon operation of said relay, a by-pass circuit means connected with the motor and controlled by a switch which operates as a function of the turning of the motor for continuing to energize said motor after cessation of current which is controlled by said relay whereby a cycle for each operation of the motor is established for a predetermined time, and additional means including switches actuated by said motor for performing different functions in connection with the starting of the motor vehicle.

8. In a remote control for starting a motor vehicle engine wherein there is a radio transmitter and a radio receiver, a relay activated by a pulse of the receiver, electrical means connected with the relay and the motor vehicle battery current supply for operating the motor vehicle starter solenoid and including an electric motor initially pulsed upon operation of said relay, a by-pass circuit means connected with the motor and controlled by a switch which operates as a function of the turning of the motor for continuing to energize said motor after cessation of current which is controlled by said relay whereby a cycle for each operation of the motor is established for a predetermined time, and additional means including switches actuated by said motor for performing different functions in connection with the starting of the motor vehicle, said additional means including an electric circuit containing a solenoid to prime the engine of the vehicle and set the automatic choke thereof, and a suction responsive switch adapted to connect with the intake manifold of the motor vehicle engine together with a safety switch adapted to be controlled by the position of the shift lever of the motor vehicle and circuit conductors extending between said vacuum switch and said safety switch and with the ignition system of the motor vehicle to render the ignition system effectual so that the motor vehicle will continue to operate when the engine is started notwithstanding the remaining of the motor vehicle ignition switch in the closed position.

References Cited in the file of this patent

UNITED STATES PATENTS

| | | |
|---|---|---|
| 1,930,029 | Alden | Oct. 10, 1933 |
| 2,397,475 | Dinga | Apr. 2, 1946 |
| 2,397,477 | Kellogg | Apr. 2, 1946 |
| 2,518,712 | Ovens | Aug. 15, 1950 |
| 2,580,820 | Nardone | Jan. 1, 1952 |
| 2,748,759 | Schiffer | June 5, 1956 |
| 2,791,699 | Taylor | May 7, 1957 |
| 2,925,076 | Jensen et al. | Feb. 16, 1960 |
| 2,952,782 | Woyden | Sept. 13, 1960 |